Feb. 25, 1958 D. S. WISE 2,824,962

SWEEP CIRCUIT OSCILLATOR

Filed Oct. 25, 1955 2 Sheets-Sheet 1

INVENTOR.
DAVID S. WISE
BY George Sipkin
Edward W Hughes
ATTORNEYS

Feb. 25, 1958 D. S. WISE 2,824,962

SWEEP CIRCUIT OSCILLATOR

Filed Oct. 25, 1955 2 Sheets-Sheet 2

INVENTOR.
DAVID S. WISE

BY George Sipkin
Edward W. Hughes
ATTORNEYS

1

2,824,962

SWEEP CIRCUIT OSCILLATOR

David S. Wise, Cleveland, Ohio, assignor, by mesne assignments, to the United States of America as represented by the Secretary of the Navy Application October 25, 1955, Serial No. 542,793

1 Claim. (Cl. 250—27)

This invention relates to a sweep circuit oscillator and in particular to a linear sweep circuit oscillator for use with oscillographic equipment in which the oscillator can be calibrated to indicate writing speed and/or frequency of the oscillator.

In order to obtain a linear sweep, a linear sawtooth wave must be generated. The voltage across a capacitor is defined by:

Eq. (1) $$e=\frac{1}{C}\int_0^T idt$$

where:

$e$=voltage across a capacitor in volts.
$C$=capacity of the capacitor in farads.
$i$=instantaneous value of current flowing in the capacitor in amperes.
$t$=time in seconds.
$T$=total time in seconds the current $i$ flowed into capacitor C.

If $i$=constant=$I$, then

Eq. (2) $$e=\frac{IT}{C}$$

From Equation 2 it can be seen that the voltage $e$ built up across a capacitor is a linear function of time when the magnitude of the current I is a constant and the capacitance of the capacitor C is also a constant. Equation 2 can be written in a different form for a recurrent sawtooth wave if it is assumed that the voltage $e$ across the condenser is allowed to build up to a given voltage $e=E$, and is then discharged substantially instantaneously.

The frequency of the sawtooth is defined by

Eq. (3) $$f=\frac{1}{T}$$

Equation 2 can then be rewritten as follows:

Eq. (4) $$f=\frac{I(\mu\text{a.})}{E(\text{volts})C(\mu\text{f.})}$$

where E is the maximum potential to which the capacitor is permitted to be charged.

From Equation 4 it is apparent that if E is a constant, the frequency $f$ is determined by the magnitudes of the capacitor C and the current I. If several capacitors, the capacitances of which are accurately known, are adapted to be connected to the sources of the constant current through a range or selector switch, and if the magnitude of the charging current is accurately measured by a D. C. microammeter, then the value of the $f$ can be determined. To do this, the ammeter is calibrated to give the vernier frequency of the sawtooth and the selector switch is calibrated to provide the proper decade multiplier.

It is, therefore, an object of the invention to provide an improved linear sweep circuit oscillator, the frequency of which is accurately determinable.

2

It is another object of the invention to provide a linear sweep circuit oscillator which has provision for driven and recurrent sweep.

Other objects and advantages of the invention will hereinafter become more fully apparent from the following description of the annexed drawings, which illustrate a preferred embodiment, and wherein.

Figure 1:
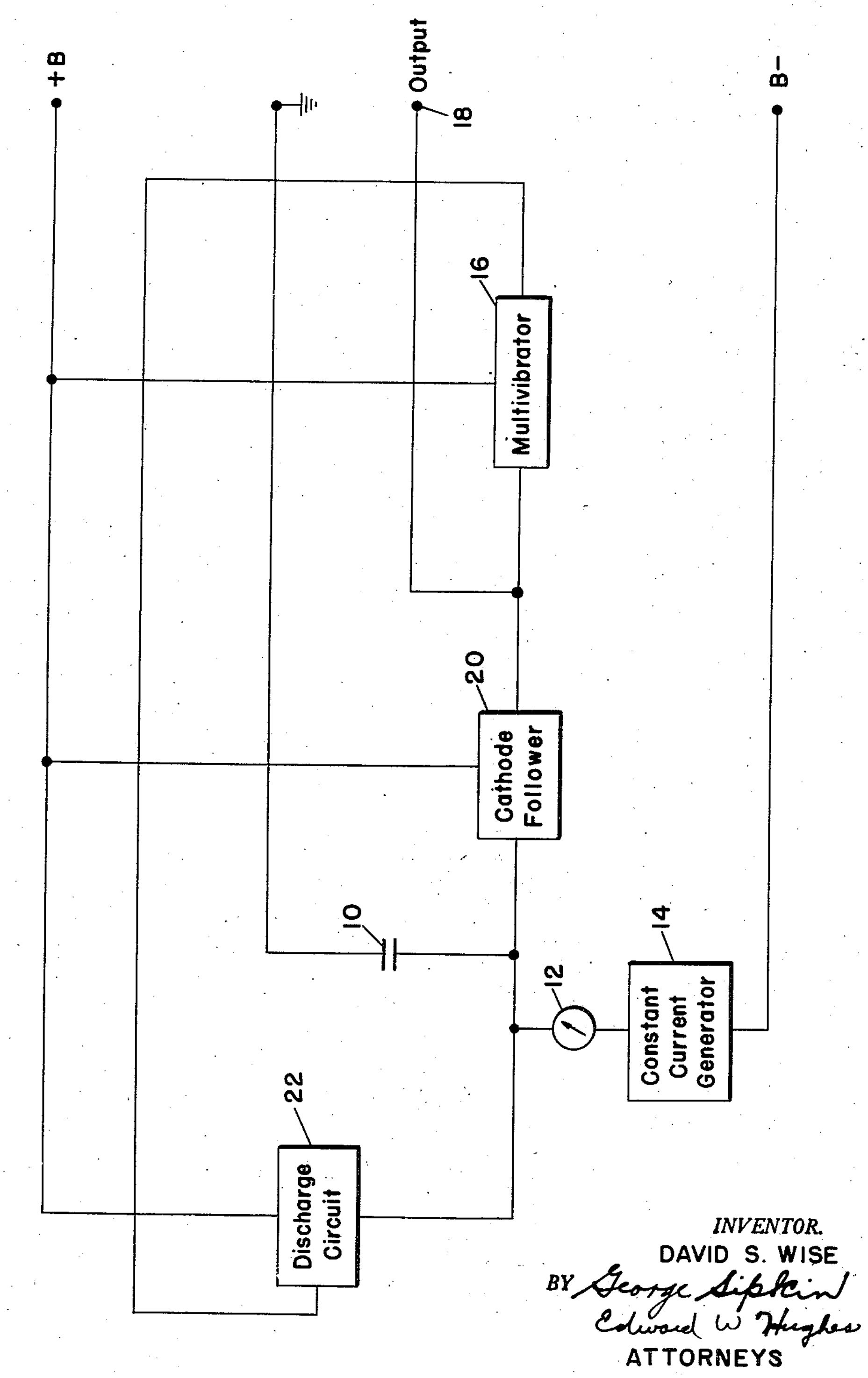
Fig. 1 is a block diagram of the sweep circuit oscillator.

Referring now to Fig. 1, capacitor 10 is connected through D. C. microammeter 12 to a constant current generator 14. The voltage across capacitor 10 will thus increase linearly as a function of time and negatively. The potential across capacitor 10 is decoupled from bistable multivibrator 16 and output terminal 18 by a conventional cathode follower circuit 20. The characteristics of cathode follower 20 and multivibrator 16 are chosen so that when the voltage across capacitor 10 reaches a first predetermined magnitude the multivibrator will change from its initial state. Discharge circuit 22 becomes conductive to discharge capacitor 10 when multivibrator 16 changes from its initial state. Capacitor 10 then loses its charge very rapidly through discharge circuit 22. When the voltage across capacitor 10 has decreased to a second predetermined magnitude which is less than the first, multivibrator 10 returns to its initial state and causes discharge circuit 22 to become non-conductive. The voltage across capacitor 10 then builds up until it reaches the first predetermined magnitude again and thus the oscillator repeats the cycle.

Figure 2:
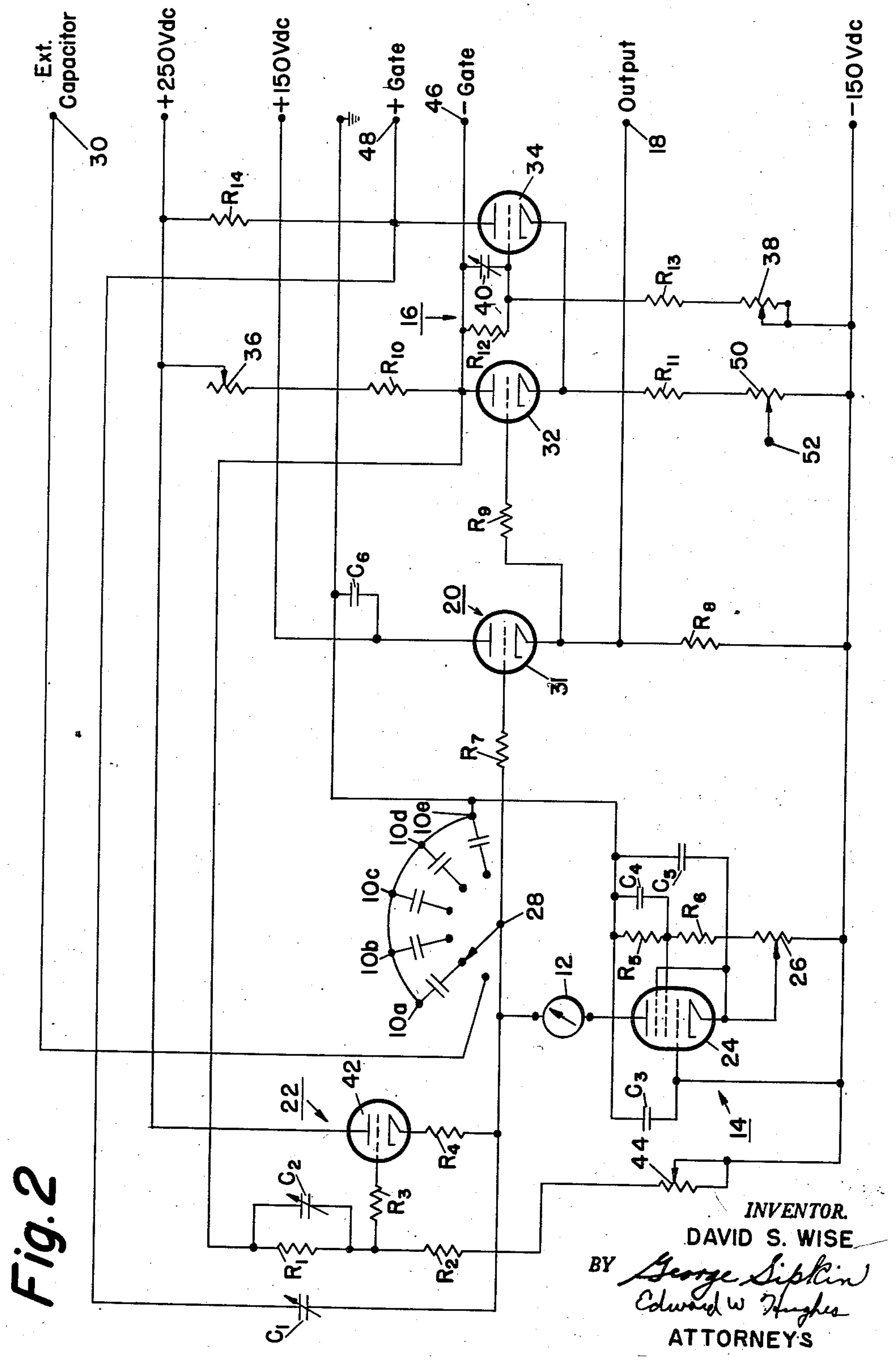
Fig. 2 is a schematic diagram of the sweep circuit oscillator.

In Fig. 2 the details of one form of the oscillator are illustrated. The major component of constant generator 14 is electron tube 24. In the generator illustrated, the magnitude of the current through tube 24 is controlled by the grid bias of tube 24 and the magnitude of the grid bias is varied by movement of the arm of potentiometer 26. Since direct current flows through tube 24 at all times, D. C. microammeter 12, which is connected in the plate circuit of tube 24, is used to measure the magnitude of the current, and is calibrated to provide the vernier reading of the frequency of the oscillator.

The output of generator 14 is connected through ammeter 12 and selector switch 28 to one of the capacitors 10*a*, 10*b*, 10*c*, 10*d*, 10*e*, or to external capacitor terminal 30. By the use of large external capacitors, the magnitudes of which are accurately known, and which are connected between terminal 30 and ground, it is possible to provide lower sweep frequencies than it is convenient to provide by the internal circuitry of the oscillator.

In Fig. 2 terminal 18 and multivibrator 16 are isolated from the voltage across capacitor 10*a* by cathode follower circuit 20 in which tube 31 is a major component. The output from cathode follower 20 is at ground level which permits D. C. coupling to the horizontal amplifier of an oscilloscope for good frequency response characteristics.

Multivibrator 16 is a voltage sensitive bistable multivibrator. When the voltage across the capacitor 10*a*, for example, starts to increase, multivibrator 16 will be in its initial condition with tube 32 conducting and tube 34 cut-off. When the voltage across the capacitor 10*a* reaches a first predetermined magnitude, multivibrator 16 changes from its initial state to its second state in which tube 32 is cut-off and tube 34 is conducting. Multivibrator 16 remains in the second state until the voltage across the capacitor 10*a* decreases to the second predetermined magnitude, at which time multivibrator 16 returns to its initial state, i. e., with tube 32 conducting and tube 34 cut-off. The voltages at which multivibrator 16 changes states are adjusted by the use of variable load resistor 36 in the plate circuit of tube 32 and the variable resistor 38 in the grid circuit of tube 34. Multivibrator 16 is frequency compensated by the use of trimmer condenser 40 between the plate of the tube 32 and the grid of tube 34.

Tube 42 of discharge circuit 22 is normally biased to cut-off so that current from generator 14 can only flow to capacitor 10*a*. When the voltage across capacitor 10*a* reaches the first predetermined magnitude, multivibrator 16 changes state. A positive pulse is applied from the plate of tube 32 to the grid of tube 42 and a negative pulse is applied from the plate of tube 34 to the cathode of tube 42. The negative pulse is not essential for the operation of the oscillator and is merely injected as a form of high frequency compensation. As a result, tube 42 conducts heavily to discharge capacitor 10*a* substantially instantaneously. When the voltage across capacitor 10*a* reaches the second predetermined magnitude, multivibrator 16 again changes its state, and a negative pulse is applied to the grid of the tube 42 and a positive pulse is applied to the cathode of tube 42 cutting it off. Capacitor 10*a* is then free to store the current from source 14 and start another cycle.

By changing the value of the grid resistor 44 the grid bias of tube 42 can be reduced so that tube 42 will continue to conduct when multivibrator 16 returns to its initial condition, i. e. with tube 32 conducting and tube 34 cut-off. Tube 42 will then draw enough current to prevent any voltage from being built up on the capacitor 10*a*. The oscillator will remain in this condition until negative and positive pulses of proper magnitudes are applied respectively to the negative gate terminal 46 and the positive gate terminal 48, or until a driving pulse is applied to terminal 52. Thus the oscillator can be modified to provide a very stable driven sweep.

If it is desired to synchronize the oscillator with another signal, this signal can be applied to the cathode of tubes 32, 34 through potentiometer 50 and terminal 52.

In one embodiment of the invention the values of the components were as follows:

Resistors:

| | |
|---|---|
| $R_1$ | 120K |
| $R_2$ | 65K |
| $R_3$ | 15K |
| $R_4$ | 15K |
| $R_5$ | 47K |
| $R_6$ | 47K |
| $R_7$ | 15K |
| $R_8$ | 10K |
| $R_9$ | 15K |
| $R_{10}$ | 6.8K |
| $R_{11}$ | 6.8K |
| $R_{12}$ | 120K |
| $R_{13}$ | 75K |
| $R_{14}$ | 4.7K |

Potentiometers:

| | |
|---|---|
| **26** | 10K |
| **36** | 10K |
| **38** | 100K |
| **44** | 100K |
| **50** | 3K |

Tubes:

| | |
|---|---|
| **24** | 6AU6 WA |
| **31** | ½ 5814 |
| **32** | ½ 5814 |
| **34** | ½ 12AT7 WA |
| **42** | ½ 12AT7 WA |

Capacitors:

| | | |
|---|---|---|
| **10***a* | μf | 1 |
| **10***b* | μf | .1 |
| **10***c* | μf | .01 |
| **10***d* | μf | .001 |
| **10***e* | μμf | 100 |
| $C_1$ | μμf | 2–13 |
| $C_2$ | μμf | 2–13 |
| $C_3$ | μf | .05 |
| $C_4$ | μf | .05 |
| $C_5$ | μf | .005 |
| $C_6$ | μf | .005 |
| **40** | μμf | 2–13 |

The values of the components of generator 14 were chosen, in this example of the invention, so that the magnitude of the current from generator 14 could be varied from 50 μamps. to 500 μamps. The value of the first predetermined magnitude was chosen as −50 volts and the value of the second predetermined magnitude was chosen as zero, or ground potential.

With these values the frequency range with capacitor 10*a* is from 1–10 C. P. S., with 10*b*, from 10–100 C. P. S., with 10*c* from 100 C. P. S to 1 kc., with 10*d*, from 1 to 10kc., and with 10*e*, from 10 to 100 kc.

The above values are exemplary of the invention and are not to be construed as being limitative.

Obviously many modifications and variations of the present invention are possible in the light of the above teachings. It is therefore to be understood that within the scope of the appended claim the invention may be practiced otherwise than as specifically described.

What is claimed is:

A sweep circuit oscillator comprising a charging capacitor, a current generator circuit including a pentode connected to the charging capacitor, a bistable multivibrator having a first tube and a second tube providing an initial state and a second state, a cathode follower connecting the output of the capacitor to said tubes of the multivibrator and being operable to change the multivibrator from its initial state to its second state when the voltage across the capacitor increases to a first predetermined value, a discharge circuit responsive to the multivibrator output and operable to discharge the capacitor when the capacitor reaches a second predetermined value, said multivibrator returning from its second state to its initial state when the capacitor is discharged, a first variable resistance means in the plate circuit of one of the multivibrator tubes for selectively setting the initial state of the multivibrator and a second variable resistance means in the grid circuit of the other multivibrator tube for selectively setting the second state of the multivibrator and a potentiometer in the current generator circuit for selectively setting the grid bias of the pentode to thereby establish a constant charge rate to the capacitor.

References Cited in the file of this patent

UNITED STATES PATENTS

| | | |
|---|---|---|
| 2,265,290 | Knick | Dec. 9, 1941 |
| 2,414,486 | Rieke | Jan. 21, 1947 |
| 2,448,069 | Ames et al. | Aug. 31, 1948 |
| 2,448,070 | Sustein | Aug. 31, 1948 |
| 2,562,188 | Hance | July 31, 1951 |
| 2,576,339 | Gray | Nov. 27, 1951 |
| 2,596,167 | Philpott | May 13, 1952 |